United States Patent
Zou

(10) Patent No.: US 11,531,235 B2
(45) Date of Patent: Dec. 20, 2022

(54) FLEXIBLE DISPLAY PANEL, MANUFACTURING METHOD THEREOF AND DISPLAY DEVICE

(71) Applicant: BOE TECHNOLOGY GROUP CO., LTD., Beijing (CN)

(72) Inventor: Xiangxiang Zou, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 295 days.

(21) Appl. No.: 16/493,467

(22) PCT Filed: Mar. 26, 2019

(86) PCT No.: PCT/CN2019/079680
§ 371 (c)(1),
(2) Date: Sep. 12, 2019

(87) PCT Pub. No.: WO2019/184911
PCT Pub. Date: Oct. 3, 2019

(65) Prior Publication Data
US 2021/0333594 A1    Oct. 28, 2021

(30) Foreign Application Priority Data
Mar. 27, 2018 (CN) .......................... 201810260368.X

(51) Int. Cl.
*G02F 1/1339* (2006.01)
*G02F 1/1333* (2006.01)
(Continued)

(52) U.S. Cl.
CPC ...... *G02F 1/13394* (2013.01); *G02F 1/13338* (2013.01); *G02F 1/133512* (2013.01);
(Continued)

(58) Field of Classification Search
CPC ......... G02F 1/133305; G02F 1/133368; G02F 2201/56; G02F 1/13338; G02F 1/1339;
(Continued)

(56) References Cited

U.S. PATENT DOCUMENTS

| | | | |
|---|---|---|---|
| 2007/0133080 A1* | 6/2007 | Shikina | G06F 3/0412 359/296 |
| 2014/0111746 A1* | 4/2014 | Kim | G02F 1/133512 349/106 |
| 2016/0103517 A1* | 4/2016 | Kang | G06F 3/0412 345/174 |
| 2017/0351141 A1* | 12/2017 | Kubota | G02F 1/133711 |
| 2018/0210258 A1 | 7/2018 | Tang | |

FOREIGN PATENT DOCUMENTS

| | | |
|---|---|---|
| CN | 1609688 A | 4/2005 |
| CN | 102854666 A | 1/2013 |

(Continued)

OTHER PUBLICATIONS

Chinese Office Action in corresponding Chinese Application No. 201810260368.X dated Apr. 18, 2019 (an English translation attached hereto). 17 pages.

*Primary Examiner* — Mariam Qureshi
(74) *Attorney, Agent, or Firm* — Leason Ellis LLP

(57) ABSTRACT

A flexible display panel, a manufacturing method thereof and a display device are disclosed. The flexible display panel includes a first flexible substrate and a second flexible substrate which are cell-assembled with each other; and a liquid crystal display layer, a black matrix grid and a plurality of polymer walls which are located between the first flexible substrate and the second flexible substrate; the liquid crystal display layer is located in gaps of the plurality of polymer walls, and includes a plurality of liquid crystal pixel units arranged in an array; the plurality of liquid crystal pixel units are delimited by a projection of the black matrix grid on the liquid crystal display layer.

6 Claims, 7 Drawing Sheets

(51) Int. Cl.
*G02F 1/1335* (2006.01)
*G06F 3/044* (2006.01)

(52) U.S. Cl.
CPC .......... *G06F 3/044* (2013.01); *G02F 1/13398* (2021.01); *G02F 1/133305* (2013.01); *G06F 2203/04102* (2013.01); *G06F 2203/04103* (2013.01); *G06F 2203/04112* (2013.01)

(58) Field of Classification Search
CPC .. G02F 1/0107; G02F 1/13396; G06F 1/1652; G06F 3/041; G06F 3/0412; G06F 2203/041; G06F 2203/04103; G06F 2203/04112; G09G 2380/02; B32B 2457/208; H01J 9/242; H01J 11/36; H01J 2211/36; H01J 2217/49271
See application file for complete search history.

(56) References Cited

FOREIGN PATENT DOCUMENTS

| | | |
|---|---|---|
| CN | 103792735 A | 5/2014 |
| CN | 105892166 A | 8/2016 |
| CN | 106054435 A | 10/2016 |
| CN | 205620652 U | 10/2016 |
| CN | 106293294 A | 1/2017 |
| CN | 106647012 A | 5/2017 |
| CN | 106775050 A | 5/2017 |
| CN | 106842661 A | 6/2017 |
| CN | 107357040 A | 11/2017 |
| CN | 107505781 A | 12/2017 |
| CN | 107741669 A | 2/2018 |
| CN | 207074325 U | 3/2018 |
| CN | 108461042 A | 8/2018 |
| JP | 2007206352 A | 8/2007 |

* cited by examiner

FLEXIBLE DISPLAY PANEL, MANUFACTURING METHOD THEREOF AND DISPLAY DEVICE

CROSS-REFERENCE TO RELATED PATENT APPLICATIONS

This application is a U.S. National Stage Application under 35 U.S.C. § 371 of International Patent Application No. PCT/CN2019/079680, filed Mar. 26, 2019, which claims the benefit of priority of Chinese Patent Application number 201810260368.X filed Mar. 27, 2018, both of which are incorporated by reference in their entireties.

TECHNICAL FIELD

Embodiments of the present disclosure relate to a flexible display panel, a manufacturing method thereof and a display device.

BACKGROUND

With the development of display technologies, display devices have achieved increasingly excellent display effects and provided users with better visual experiences. In recent years, due to growth in the living standards, user's requirements on the display device are no longer restricted to the display effect but also directed to multiple functions. As a result, flexible display panel has been widely used in a display screen of an electronic device such as a mobile phone, a personal digital assistance (PDA) and a computer.

SUMMARY

At least one embodiment of the present disclosure provides a flexible display panel, a manufacturing method thereof and a display device.

An embodiment of the present disclosure provides a flexible display panel, including: a first flexible substrate and a second flexible substrate that are cell-assembled; and a liquid crystal display layer, a black matrix grid and a plurality of polymer walls that are located between the first flexible substrate and the second flexible substrate. The liquid crystal display layer is located in gaps of the plurality of polymer walls, and is divided into a plurality of liquid crystal pixel units arranged in an array by a projection of the black matrix grid on the liquid crystal display layer.

In an alternative embodiment, projections of the plurality of polymer walls on the liquid crystal display layer are not overlapped with the projection of the black matrix grid on the liquid crystal display layer.

In an alternative embodiment, the plurality of polymer walls include a plurality of first polymer walls and a plurality of second polymer walls; the plurality of first polymer walls are disposed in parallel with each other; the plurality of second polymer walls are disposed in parallel with each other; and the plurality of first polymer walls are disposed to be intersected with the plurality of second polymer walls.

In an alternative embodiment, a spaced distance between adjacent two of the first polymer walls is smaller than a side length of the liquid crystal pixel unit, and a spaced distance between adjacent two of the second polymer walls is smaller than the side length of the liquid crystal pixel unit.

In an alternative embodiment, the flexible display panel further includes a touch layer disposed at a side of the second flexible substrate away from the first flexible substrate.

In an alternative embodiment, the touch layer is provided with a touch metal mesh.

In an alternative embodiment, the projections of the plurality of polymer walls on the liquid crystal display layer are completely overlapped with a projection of the touch metal mesh on the liquid crystal display layer.

Another embodiment of the present disclosure further provides a display device, including the flexible display panel described in the foregoing embodiments.

Yet another embodiment of the present disclosure further provides a manufacturing method of a flexible display panel, including: providing a first flexible substrate; forming a plurality of polymer walls on a surface of the first flexible substrate; forming a liquid crystal display layer in gaps of the plurality of polymer walls on the surface of the first flexible substrate; forming a black matrix grid on the liquid crystal display layer; providing a second flexible substrate on the black matrix grid, and cell-assembling the second flexible substrate with the first flexible substrate.

In an alternative embodiment, forming the plurality of polymer walls by using mask lithography technology.

In an alternative embodiment, the manufacturing method of the flexible display panel further includes: forming a touch layer at a side of the second flexible substrate away from the first flexible substrate.

Still another embodiment of the present disclosure further provides a manufacturing method of a flexible display panel, including: providing a base panel, the base panel including a first flexible substrate and a second flexible substrate cell-assembled with the first flexible substrate, and a liquid crystal display layer located between the first flexible substrate and the second flexible substrate; performing an irradiating and etching process to the base panel by using a mask provided with a grid pattern, to form a plurality of polymer walls on the first flexible substrate; and forming a touch layer at a side of the second flexible substrate away from the first flexible substrate by using the mask provided with the grid pattern.

In an alternative embodiment, the irradiating and etching process is performed by using UV-irradiation.

BRIEF DESCRIPTION OF THE DRAWINGS

In order to clearly illustrate the technical solutions of the embodiments of the present disclosure, the drawings of the embodiments will be briefly described in the following. Apparently, the described embodiments are just a part but not all of the embodiments of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the related art, the flexible display panel usually utilizes spacers to ensure the strength thereof. However, during research, inventors of the present invention has found that, the spacer is liable to damage (e.g., scratch) the flexible substrate when the spacer is bent, resulting in problems such as light leakage.

Figure 1:
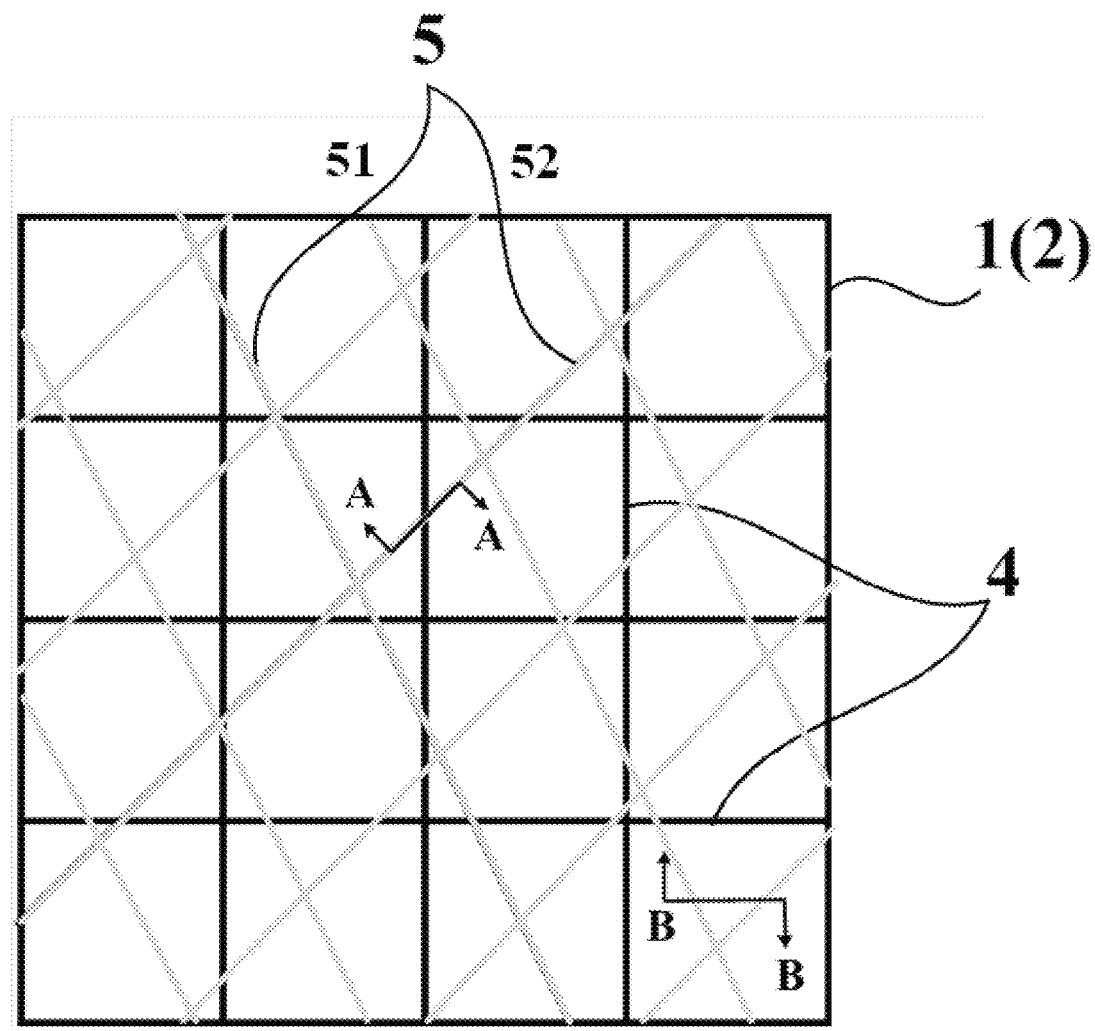
FIG. 1 is a top view illustrating a flexible display panel provided by an embodiment of the present disclosure.
Figure 2:
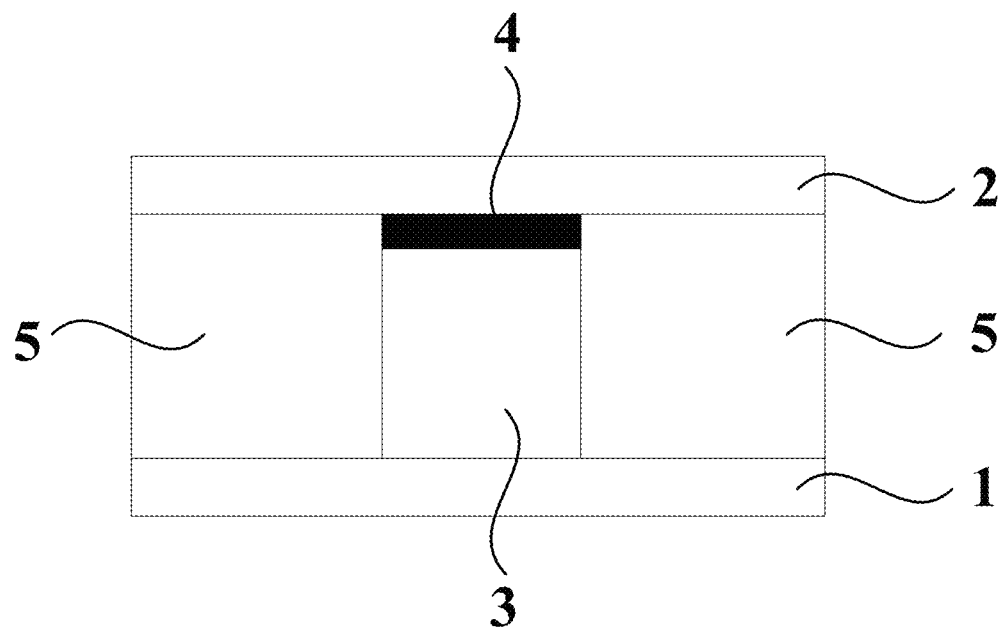
FIG. 2 is a structural view illustrating an A-A cross-section of a flexible display panel provided by an embodiment of the present disclosure.
Figure 3:
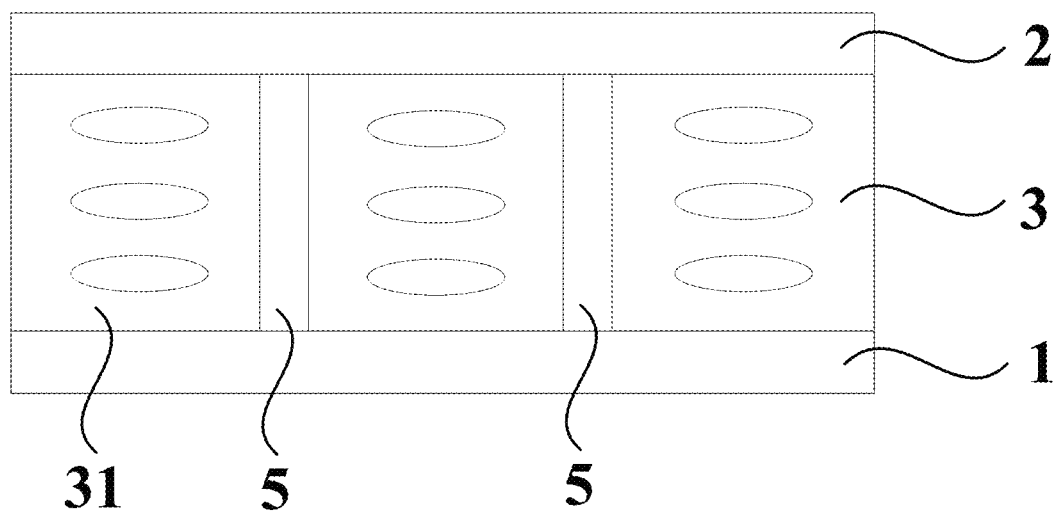
FIG. 3 is a structural view illustrating a B-B cross-section of a flexible display panel provided by an embodiment of the present disclosure.

In order to overcome the problems described above, at least one embodiment of the present disclosure provides a flexible display panel. As illustrated in FIGS. 1-3, the flexible display panel includes: a first flexible substrate 1 and a second flexible substrate 2 which are cell-assembled with each other; and a liquid crystal display layer 3, a black matrix grid 4 and a plurality of polymer walls 5 which are located between the first flexible substrate 1 and the second flexible substrate 2. The plurality of polymer walls 5 and the liquid crystal display layer 3 are disposed in a same layer; and the liquid crystal display layer 3 is divided into a plurality of liquid crystal pixel units 31 arranged in an array, by a projection of the black matrix grid 4 on the liquid crystal display layer 3.

In the flexible display panel provided by an embodiment of the present disclosure, the liquid crystal display layer 3 is provided with a plurality of polymer walls 5, and the polymer wall 5 is formed by a high macromolecule material such as polymer. In this way, by providing the polymer walls 5 made of high macromolecule material between the first flexible substrate 1 and the second flexible substrate 2, an amount of relative movements between the first flexible substrate 1 and the second flexible substrate 2 when the display panel is bended is decreased as compared to the related art which utilizes spacers, thereby reducing the damage to the first flexible substrate 1 and the second flexible substrate 2 resulted from the polymer walls 5 and improving the display effect of the flexible display panel.

As illustrated in FIG. 1 and FIG. 2, in the flexible display panel provided by the embodiment of the present disclosure, projections of the plurality of polymer walls 5 on the liquid crystal display layer 3 are not overlapped with a projection of the black matrix grid 4 on the liquid crystal display layer 3. For example, as illustrated in FIG. 1, the plurality of polymer walls 5 include a plurality of first polymer walls 51 and a plurality of second polymer walls 52; the plurality of first polymer walls 51 are disposed in parallel with each other; the plurality of second polymer walls 52 are disposed in parallel with each other; and the plurality of first polymer walls 51 are disposed to be intersected with the plurality of second polymer walls 52. The plurality of first polymer walls 51 disposed in parallel are intersected with the plurality of second polymer walls 52 disposed in parallel so as to form a grid pattern, which can further enhance an effect of the polymer walls 5 for supporting the flexible display panel and also increase a bonding force between the polymer walls 5 and each of the first flexible substrate 1 and the second flexible substrate 2.

As illustrated in FIG. 2, in the flexible display panel provided by the embodiment of the present disclosure, the polymer wall 5 is not a continuously formed wall. That is, both of the first polymer wall 51 and the second polymer wall 52 are disconnected walls in a form of dotted line. A disconnected polymer wall can ensure the strength of the flexible display panel without affecting the division of the liquid crystal pixel units by the black matrix grid.

For example, in the flexible display panel provided by the embodiment of the present disclosure, a spaced distance between adjacent two of the first polymer walls 51 is smaller than a side length of the liquid crystal pixel unit 31, and a spaced distance between adjacent two of the second polymer walls 52 is smaller than the side length of the liquid crystal pixel unit 31. The liquid crystal pixel unit 31 usually has a rectangular shape (including a square shape), and a side length of the liquid crystal pixel unit 31 includes a length and a width. By arranging the spaced distance between adjacent two of the first polymer walls 51 or the spaced distance between adjacent two of the second polymer walls 52 to be smaller than the side length (length and width) of the liquid crystal pixel unit 31, it can ensure the display effect of the liquid crystal pixel units while increasing the strength of the display panel as far as possible.

Figure 4:
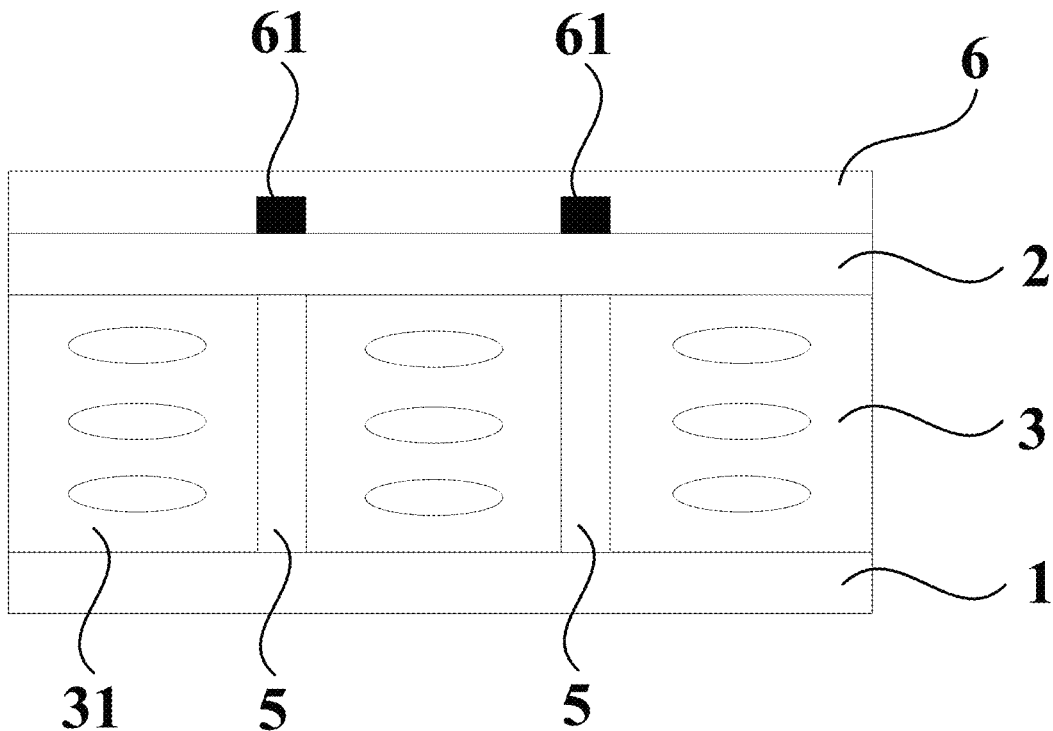
FIG. 4 is a structural view illustrating a B-B cross-section of a flexible display panel provided by another embodiment of the present disclosure.

As illustrated in FIG. 4, the flexible display panel provided by the embodiment of the present disclosure can further include a touch layer 6 disposed at a side of the second flexible substrate 2 away from the first flexible substrate 1. The flexible display panel provided with the touch layer 6 can achieve controlling and switching the contents as displayed through touch control, can further enrich the function of the flexible display panel, and can expand the applicable scope of the flexible display panel.

Still referring to FIG. 4, in the flexible display panel provided by the embodiment of the present disclosure, the touch layer 6 can be provided with a touch metal mesh 61. The projections of the plurality of polymer walls 5 on the liquid crystal display layer 3 are completely overlapped with a projection of the touch metal mesh 61 on the liquid crystal display layer 3. With the arrangement of the touch metal mesh 61 and the plurality of polymer walls 5 having completely overlapped projections on the liquid crystal display layer 3 with the touch metal mesh 61, it can reduce the display loss resulted by the shielding effect of the touch metal mesh 61 and the plurality of polymer walls 5 as far as possible, so as to improve the display effect of the flexible display panel; moreover, forming the touch metal mesh 61 and the plurality of polymer walls 5 having completely overlapped projections with the touch metal mesh 61, on the liquid crystal display layer 3, can be realized by using one and the same mask, so as to achieve the objectives of simplifying the processing flows and lowering the manufacturing cost.

Another embodiment of the present disclosure further provides a flexible display device, including the flexible display panel described in the foregoing. The flexible display device adopting the above-described flexible display panel possesses structural features as same as that of the flexible display panel, and hence can achieve the same technical effects. That is to say, the liquid crystal display layer 3 is provided with a plurality of polymer walls 5, and the plurality of polymer walls 5 each are formed by a high macromolecule material such as polymer. In this way, by providing the polymer walls 5 of high macromolecule material between the first flexible substrate 1 and the second flexible substrate 2, an amount of relative movements between the first flexible substrate 1 and the second flexible substrate 2 when the display panel is bended is decreased as compared to the related art which utilizes spacers, thereby reducing the damage to the first flexible substrate 1 and the second flexible substrate 2 resulted from the polymer walls 5 and improving the display effect of the flexible display panel.

Figure 5:
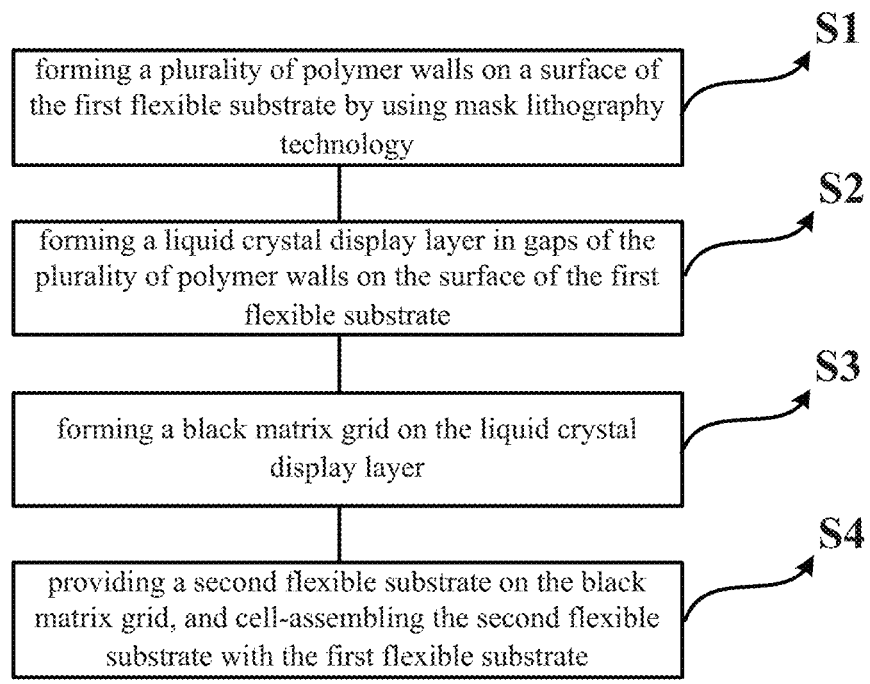
FIG. 5 is a flow chart illustrating a manufacturing method of a flexible display panel provided by an embodiment of the present disclosure.

Referring to FIG. 5, yet another embodiment of the present disclosure further provides a manufacturing method of a flexible display panel, which can include the following steps:

Step S1, forming a plurality of polymer walls on a surface of the first flexible substrate;

Step S2, forming a liquid crystal display layer in gaps of the plurality of polymer walls on the surface of the first flexible substrate;

Step S3, forming a black matrix grid on the liquid crystal display layer;

Step S4, providing a second flexible substrate on the black matrix grid, and cell-assembling the second flexible substrate with the first flexible substrate.

For example, in the step S1, depositing a film layer of high macromolecule material such as polymer on the first flexible substrate; then forming a plurality of polymer walls from the film layer by using, for example, mask lithography technology in such a manner that, the plurality of polymer walls include a plurality of first polymer walls 51 disposed in parallel with each other and a plurality of second polymer walls 52 disposed in parallel with each other and intersected with the plurality of first polymer walls 51, as illustrated in FIG. 1. For example, both of the first polymer wall 51 and the second polymer wall 52 are disconnected polymer walls, so that projections of the plurality of polymer walls on the first flexible substrate are not overlapped with the projection of the black matrix grid on the first flexible substrate, as illustrated in FIG. 2.

It should be explained that, processing steps not particularly described in the embodiments of the present disclosure can be implemented by processing steps well-known for those ordinary skilled in the art. For example, the mask lithography technology as mentioned above, as well as the formation of the liquid crystal display layer and the black matrix grid, all can be implemented by well-known technologies in the art and will not be particularly described herein.

In the flexible display panel obtained by using the manufacturing method provided by the embodiments of the present disclosure, the liquid crystal display layer 3 is provided with a plurality of polymer walls 5, and the plurality of polymer walls 5 are formed by high macromolecule materials such as polymers. In this way, by providing the polymer walls 5 of high macromolecule material between the first flexible substrate 1 and the second flexible substrate 2, an amount of relative movements between the first flexible substrate 1 and the second flexible substrate 2 when the display panel is bended is decreased as compared to the related art which utilizes spacers, thereby reducing the damage to the first flexible substrate 1 and the second flexible substrate 2 resulted from the polymer walls 5 and improving the display effect of the flexible display panel.

Figure 6:
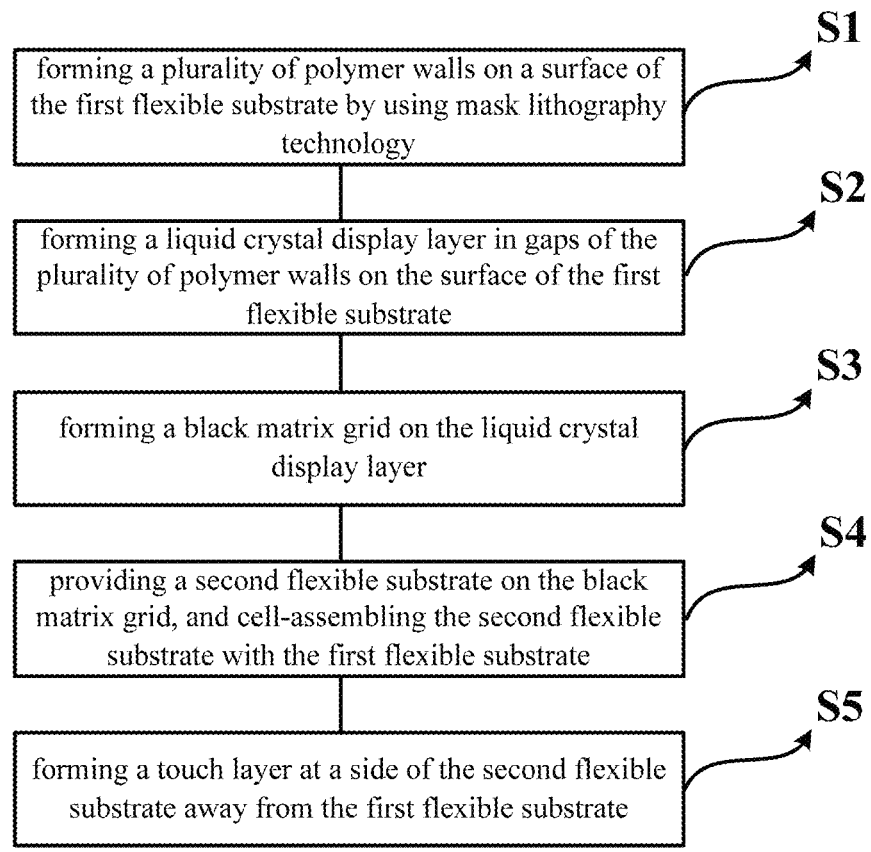
FIG. 6 is a flow chart illustrating a manufacturing method of a flexible display panel provided by another embodiment of the present disclosure.

As illustrated in FIG. 6, the manufacturing method of the flexible display panel provided by the present embodiment can further include:

Step S5, forming a touch layer at a side of the second flexible substrate away from the first flexible substrate. For example, depositing a metal layer on a surface of the second flexible substrate away from the first flexible substrate, then coating a photoresist layer on the metal layer, then exposing and developing the photoresist layer by using a mask provided with a grid pattern to form a touch layer 6 provided with a metal mesh 61 as illustrated in FIG. 6. The process of forming the above-mentioned touch layer 6 in the present embodiment will be described in more details later with reference to FIG. 7a-FIG. 7e.

Still another embodiment of the present disclosure further provides a manufacturing method of a flexible display panel, which can include the following steps:

Step S1, providing a base panel, the base panel including: a first flexible substrate and a second flexible substrate cell-assembled with the first flexible substrate, and a liquid crystal display layer located between the first flexible substrate and the second flexible substrate;

Step S2, performing an irradiating and etching process to the base panel by using a mask provided with a grid pattern, to form a plurality of polymer walls on the first flexible substrate; for example, the irradiating and etching process can be implemented by using UV-irradiation.

Step S3, forming a touch layer at a side of the second flexible substrate away from the first flexible substrate by using the mask provided with the grid pattern.

During an actual manufacturing process, the steps S1-S3 can be implemented according to the technical process illustrated in FIG. 7a-FIG. 7e.

Figure 7A:
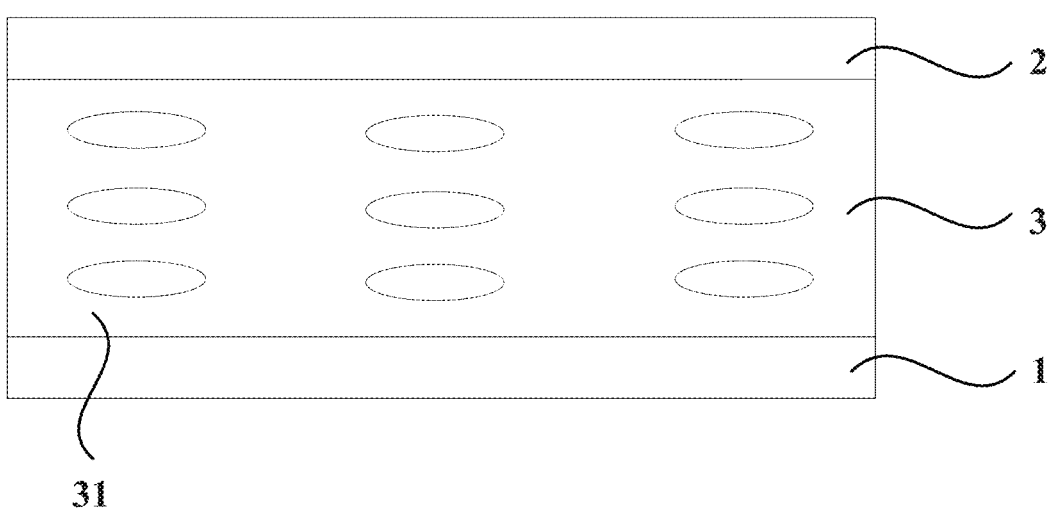
FIG. 7a is a flow chart illustrating a manufacturing method of a flexible display panel provided by still another embodiment of the present disclosure.

As illustrated in FIG. 7a, UV-irradiating the base panel including the first flexible substrate 1, the second flexible substrate 2 and the liquid crystal display layer 3, by using a mask 7 which is provided with a grid pattern and configured to form a touch electrode, so as to form the polymer walls 5 in a projection area of the grid pattern on the first substrate (lower substrate) through mask lithography technology.

Figure 7B:
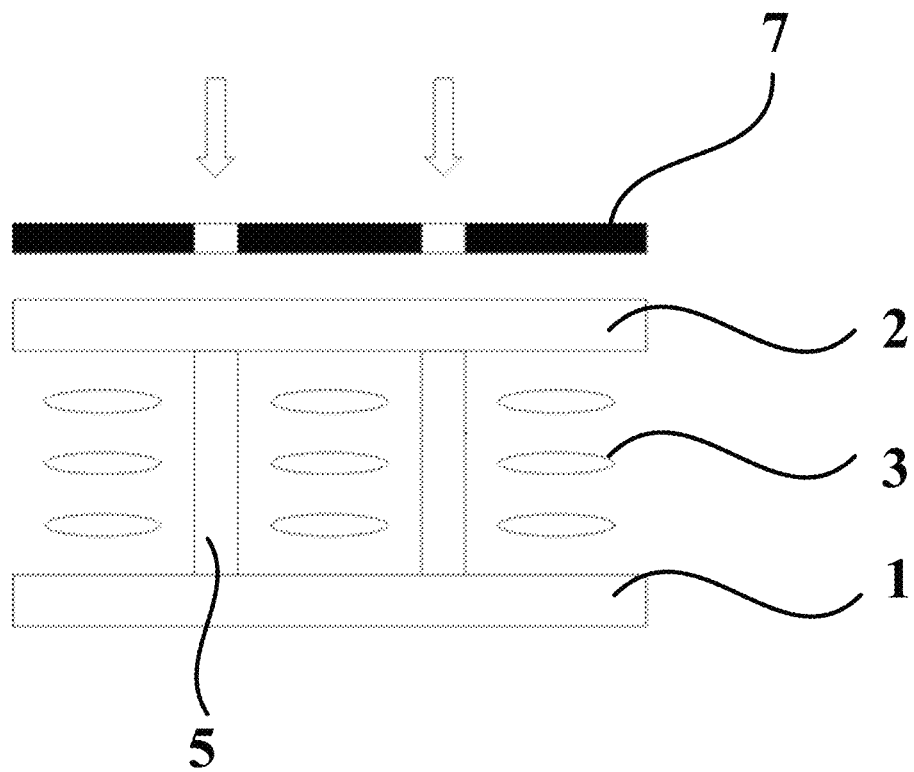
FIG. 7b is a flow chart illustrating a manufacturing method of a flexible display panel provided by still another embodiment of the present disclosure.
Figure 7C:
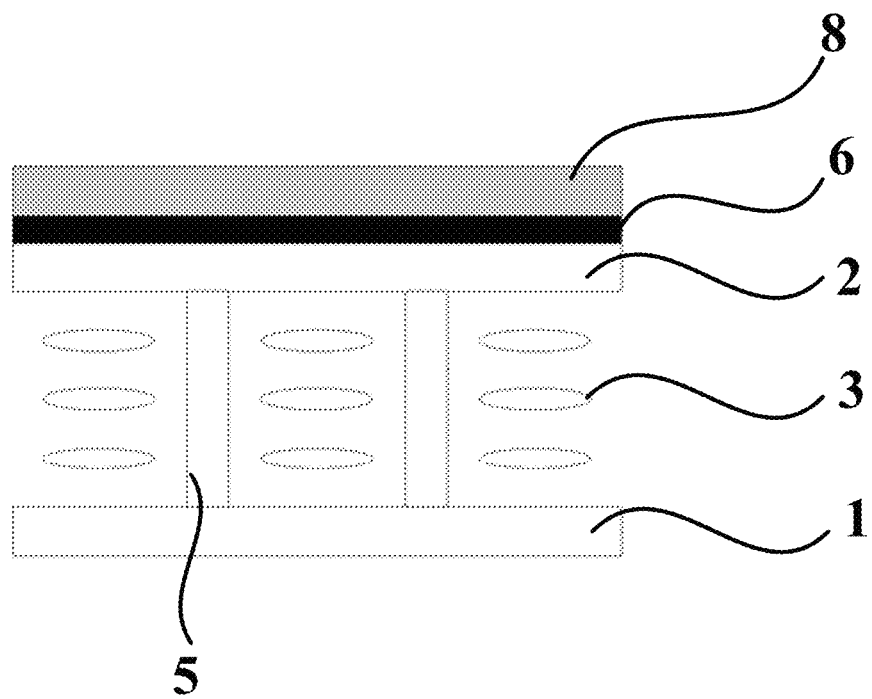
FIG. 7c is a flow chart illustrating a manufacturing method of a flexible display panel provided by still another embodiment of the present disclosure.

As illustrated in FIG. 7b and FIG. 7c, depositing a metal layer 6 at a side of the second flexible substrate 2 (upper substrate) away from the first flexible substrate 1 (lower substrate), and then coating a photoresist layer 8 on the metal layer 6.

Figure 7D:
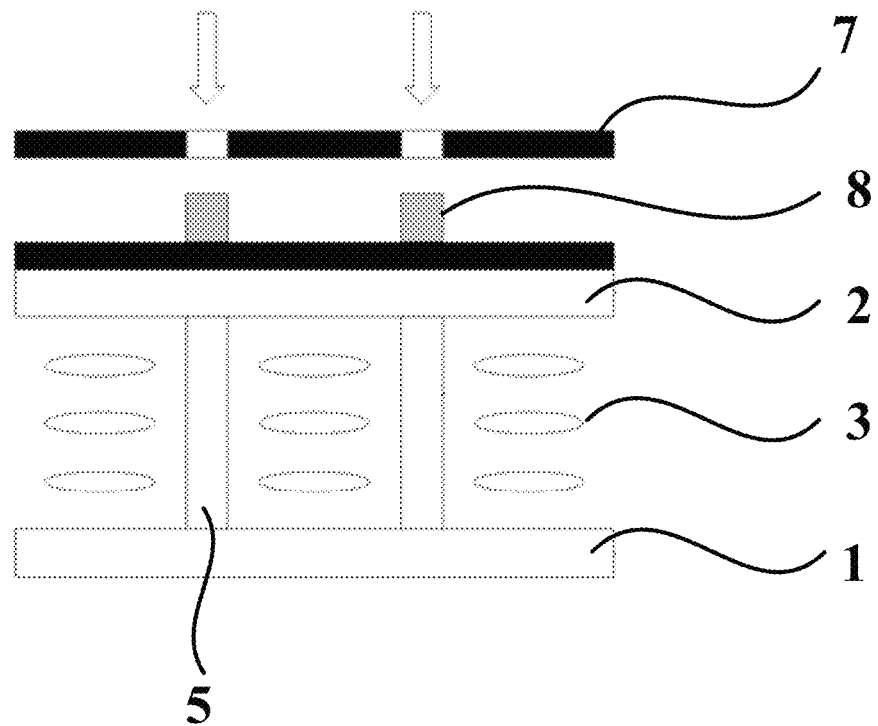
FIG. 7d is a flow chart illustrating a manufacturing method of a flexible display panel provided by still another embodiment of the present disclosure.

As illustrated in FIG. 7d, exposing and developing the photoresist layer 8 by using the above-described mask 7 with the grid pattern for forming the polymer walls 5. When a negative photoresist is used, the irradiated portion of the photoresist layer 8 would be remained.

Figure 7E:
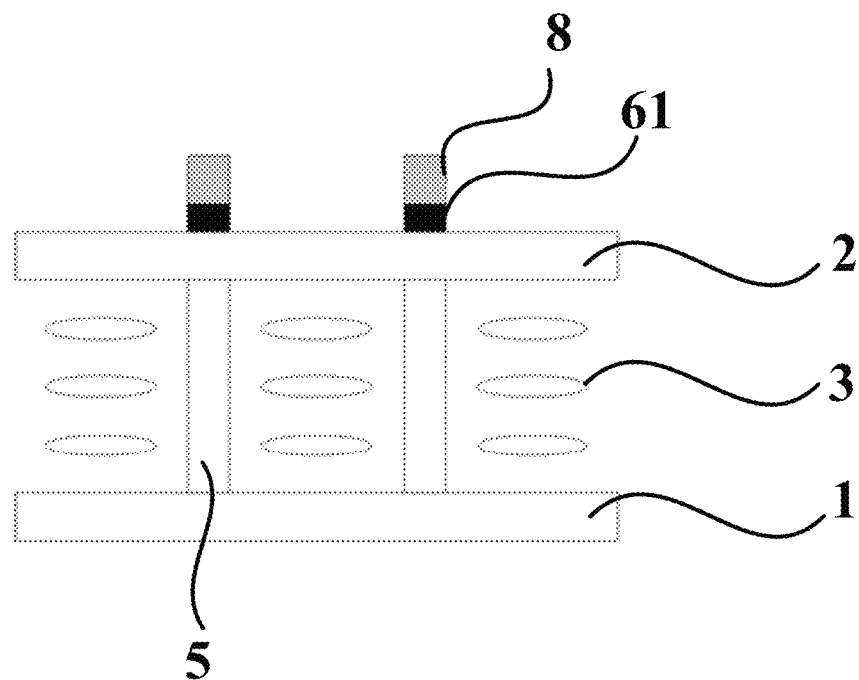
FIG. 7e is a flow chart illustrating a manufacturing method of a flexible display panel provided by still another embodiment of the present disclosure.

As illustrated in FIG. 7e, etching the metal layer 6 having been exposed and developed, to form a touch layer 6 with a pattern of touch electrode; that is, the touch layer 6 includes a touch metal mesh 61.

Figure 7F:
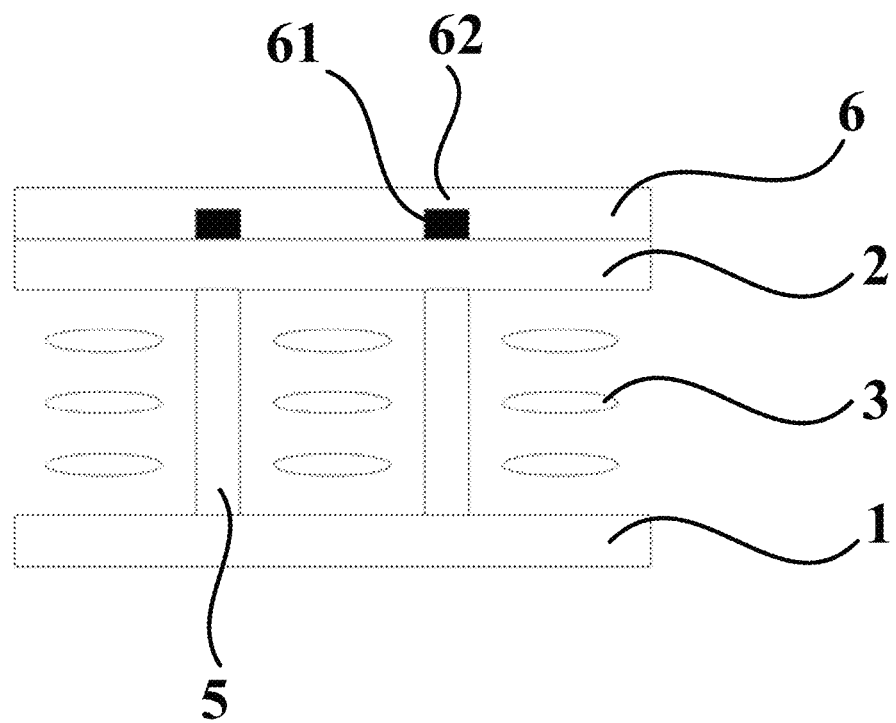
FIG. 7f is a flow chart illustrating a manufacturing method of a flexible display panel provided by still another embodiment of the present disclosure.

As illustrated in FIG. 7f, peeling off the negative photoresist 8, and depositing a protecting layer 62, so as to finish the manufacturing process of the flexible display panel.

Those skilled in the art should be appreciated that, processing steps not particularly described in the present embodiment, for example, the formation of the black matrix grid, can refer to the related contents in the foregoing embodiments and will not be particularly described herein.

In the manufacturing method of the flexible display panel provided by the present embodiment, the touch layer and the polymer walls can be formed by using one and the same mask, without the need of using an additional mask for the irradiating and etching process of the polymer walls, which reduces the amount of masks as used in the entire manufacturing process and lowers the manufacturing cost. Furthermore, the polymer walls as formed are located right below the touch metal mesh of the touch layer, and projections of the plurality of polymer walls on the liquid crystal display layer are completely overlapped with the projection of the touch metal mesh on the liquid crystal display layer, thereby allowing for a flexible display panel having high aperture ratio.

The above are only specific implementations of the present disclosure, and the protection scope of the present disclosure is not limited thereto. Any modifications or substitutions easily occur to those skilled in the art within the technical scope of the present disclosure should be fallen within the protection scope of the present disclosure. Therefore, the protection scope of the present disclosure should be based on the protection scope of the claims and the equivalents thereof.

The present application claims priority of China Patent application No. 201810260368.X filed on Mar. 27, 2018, the content of which is incorporated in its entirety as portion of the present application by reference herein.

What is claimed is:

1. A flexible display panel, comprising:
   a first flexible substrate and a second flexible substrate that are cell-assembled with each other; and
   a liquid crystal display layer, a black matrix grid and a plurality of polymer walls that are located between the first flexible substrate and the second flexible substrate, wherein
   the liquid crystal display layer is located in gaps of the plurality of polymer walls, and comprises a plurality of liquid crystal pixel units arranged in an array, the plurality of liquid crystal pixel units are delimited by a projection of the black matrix grid on the liquid crystal display layer,
   the black matrix grid is located on a side of the second flexible substrate that is in direct contact with the liquid crystal display layer,
   wherein projections of the plurality of polymer walls on the liquid crystal display layer are not overlapped with the projection of the black matrix grid on the liquid crystal display layer,
   wherein the flexible display panel further comprises a touch layer disposed at a side of the second flexible substrate away from the first flexible substrate, the touch layer is provided with a touch metal mesh, the projections of the plurality of polymer walls on the liquid crystal display layer are completely overlapped with a projection of the touch metal mesh on the liquid crystal display layer,
   wherein the black matrix grid and the touch metal mesh are respectively at opposite sides of the second flexible substrate, and
   wherein the projection of the black matrix grid on the liquid crystal display layer is not overlapped with the projection of the touch metal mesh on the liquid crystal display layer wherein
   the plurality of polymer walls comprise a plurality of first polymer walls and a plurality of second polymer walls, a spaced distance between adjacent two of the first polymer walls is smaller than a side length of the liquid crystal pixel unit, and a spaced distance between adjacent two of the second polymer walls is smaller than the side length of the liquid crystal pixel unit.

2. The flexible display panel according to claim 1, wherein
   the plurality of first polymer walls are disposed in parallel with each other;
   the plurality of second polymer walls are disposed in parallel with each other; and
   the plurality of first polymer walls are disposed to be intersected with the plurality of second polymer walls.

3. A display device, comprising the flexible display panel according to claim 1.

4. A manufacturing method of a flexible display panel, comprising:
   providing a first flexible substrate;
   forming a plurality of polymer walls on a surface of the first flexible substrate;
   forming a liquid crystal display layer in gaps of the plurality of polymer walls on the surface of the first flexible substrate;
   forming a black matrix grid on the liquid crystal display layer; and
   providing a second flexible substrate on the black matrix grid, and cell-assembling the second flexible substrate with the first flexible substrate, wherein the black matrix grid is located on a side of the second flexible substrate that is in direct contact with the liquid crystal display layer,
   the manufacturing method further comprising: forming a touch layer at a side of the second flexible substrate away from the first flexible substrate,
   wherein projections of the plurality of polymer walls on the liquid crystal display layer are not overlapped with a projection of the black matrix grid on the liquid crystal display layer,
   wherein the touch layer is provided with a touch metal mesh, the projections of the plurality of polymer walls on the liquid crystal display layer are completely overlapped with a projection of the touch metal mesh on the liquid crystal display layer, wherein the black matrix grid and the touch metal mesh are respectively at opposite sides of the second flexible substrate, and wherein the projection of the black matrix grid on the liquid crystal display layer is not overlapped with the projection of the touch metal mesh on the liquid crystal display layer, wherein the plurality of polymer walls comprise a plurality of first polymer walls and a plurality of second polymer walls, a spaced distance between adjacent two of the first polymer walls is smaller than a side length of the liquid crystal pixel unit, and a spaced distance between adjacent two of the second polymer walls is smaller than the side length of the liquid crystal pixel unit.

5. The manufacturing method of the flexible display panel according to claim 4, wherein forming the plurality of polymer walls by using mask lithography technology.

6. The display device according to claim 3, wherein the plurality of first polymer walls are disposed in parallel with each other;

the plurality of second polymer walls are disposed in parallel with each other; and the plurality of first polymer walls are disposed to be intersected with the plurality of second polymer walls.

* * * * *